(No Model.) 5 Sheets—Sheet 1.
J. R. WILLIAMS.
MACHINE FOR CUTTING OUT WRAPPERS OR BINDERS FOR CIGARS.
No. 594,507. Patented Nov. 30, 1897.
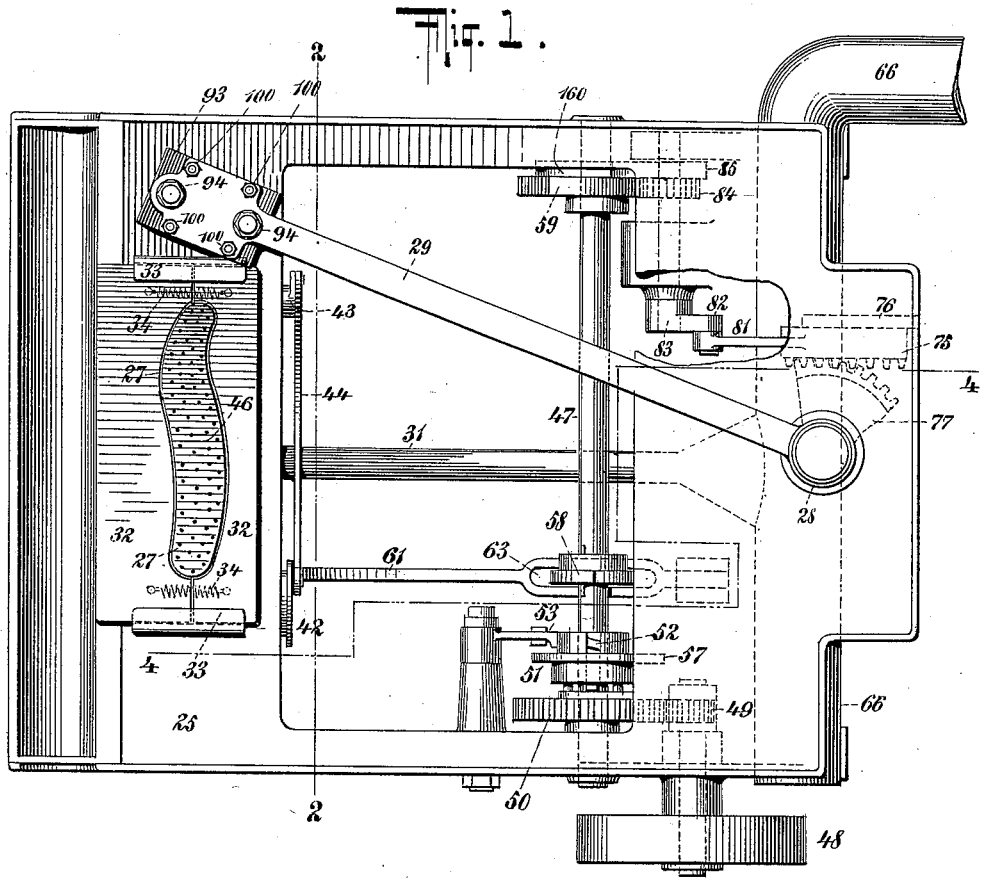
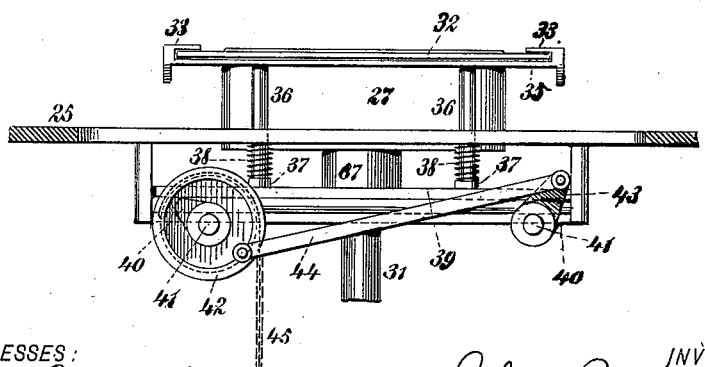
WITNESSES: INVENTOR
Gustave Dieterich John R. Williams,
John Kehlinbeck. BY
Chas. C. Gill
ATTORNEY (No Model.) 5 Sheets—Sheet 2.
J. R. WILLIAMS.
MACHINE FOR CUTTING OUT WRAPPERS OR BINDERS FOR CIGARS.
No. 594,507. Patented Nov. 30, 1897.
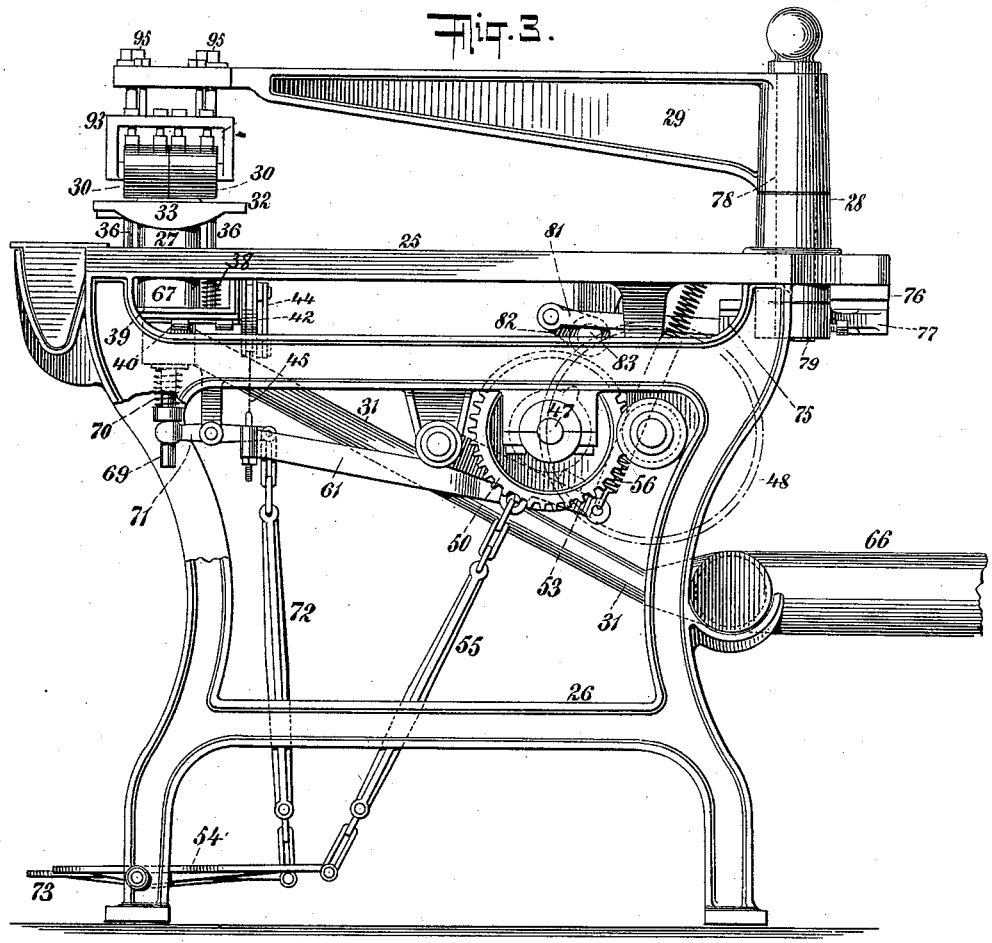
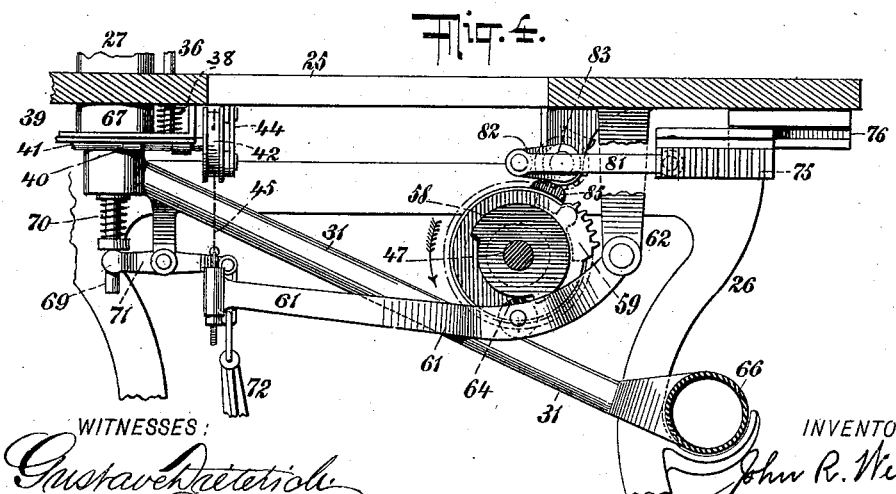
WITNESSES:
INVENTOR
John R. Williams,
BY
Chas. C. Gill
ATTORNEY.

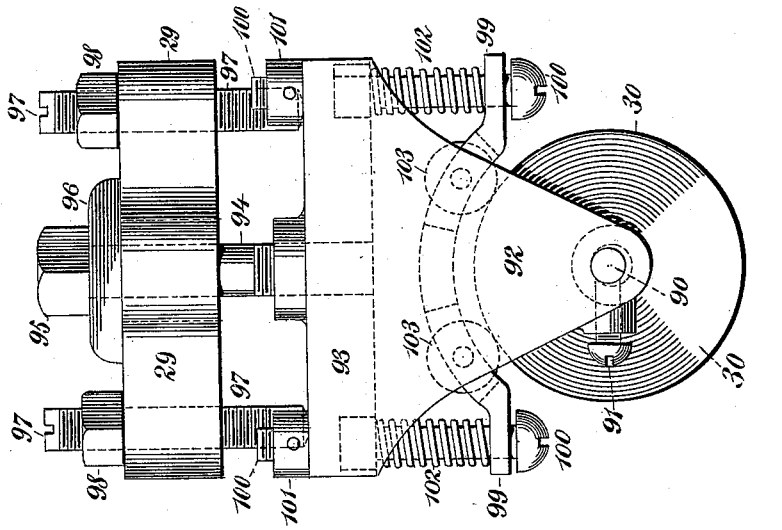

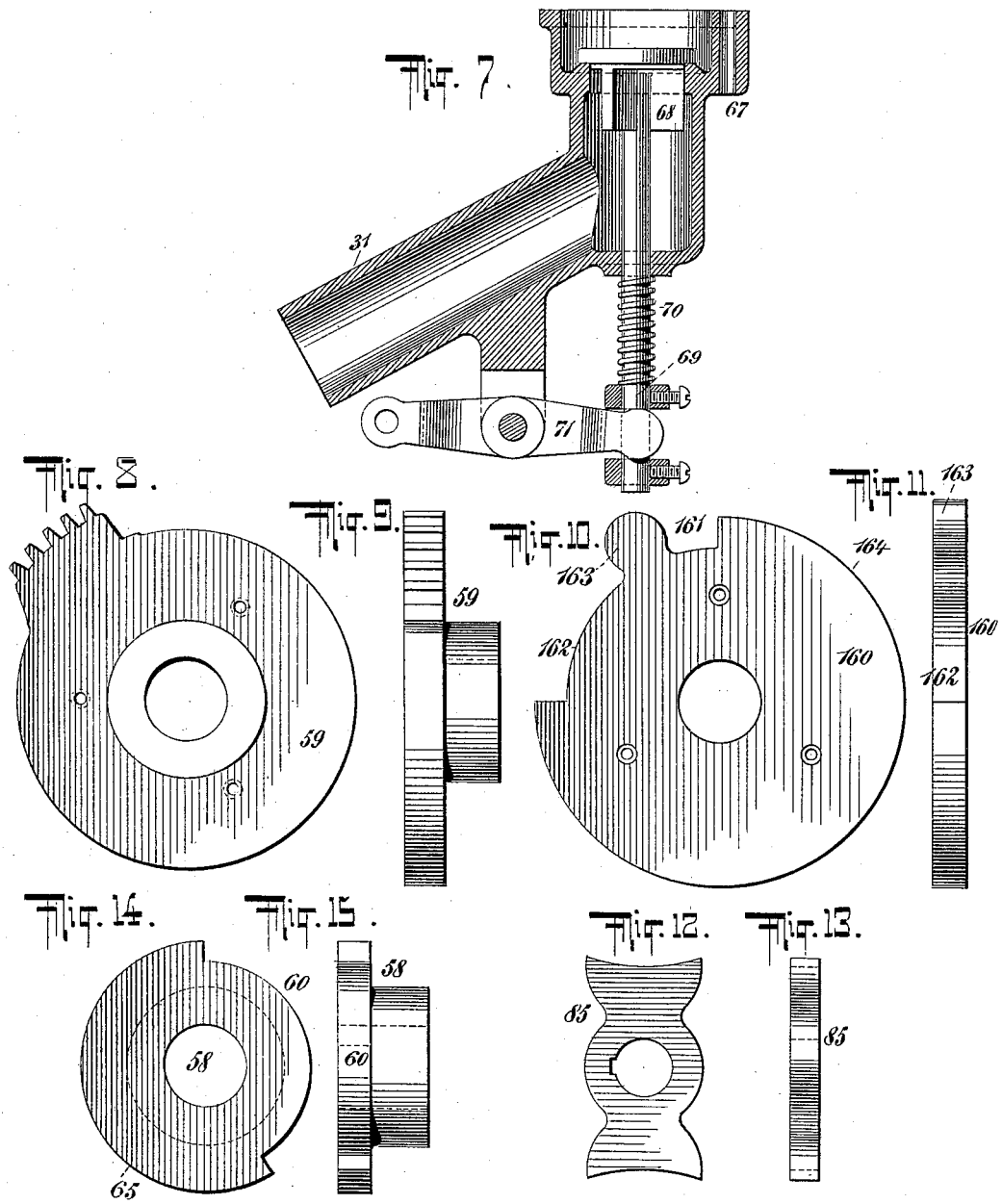

(No Model.) 5 Sheets—Sheet 5.
J. R. WILLIAMS.
MACHINE FOR CUTTING OUT WRAPPERS OR BINDERS FOR CIGARS.
No. 594,507. Patented Nov. 30, 1897.
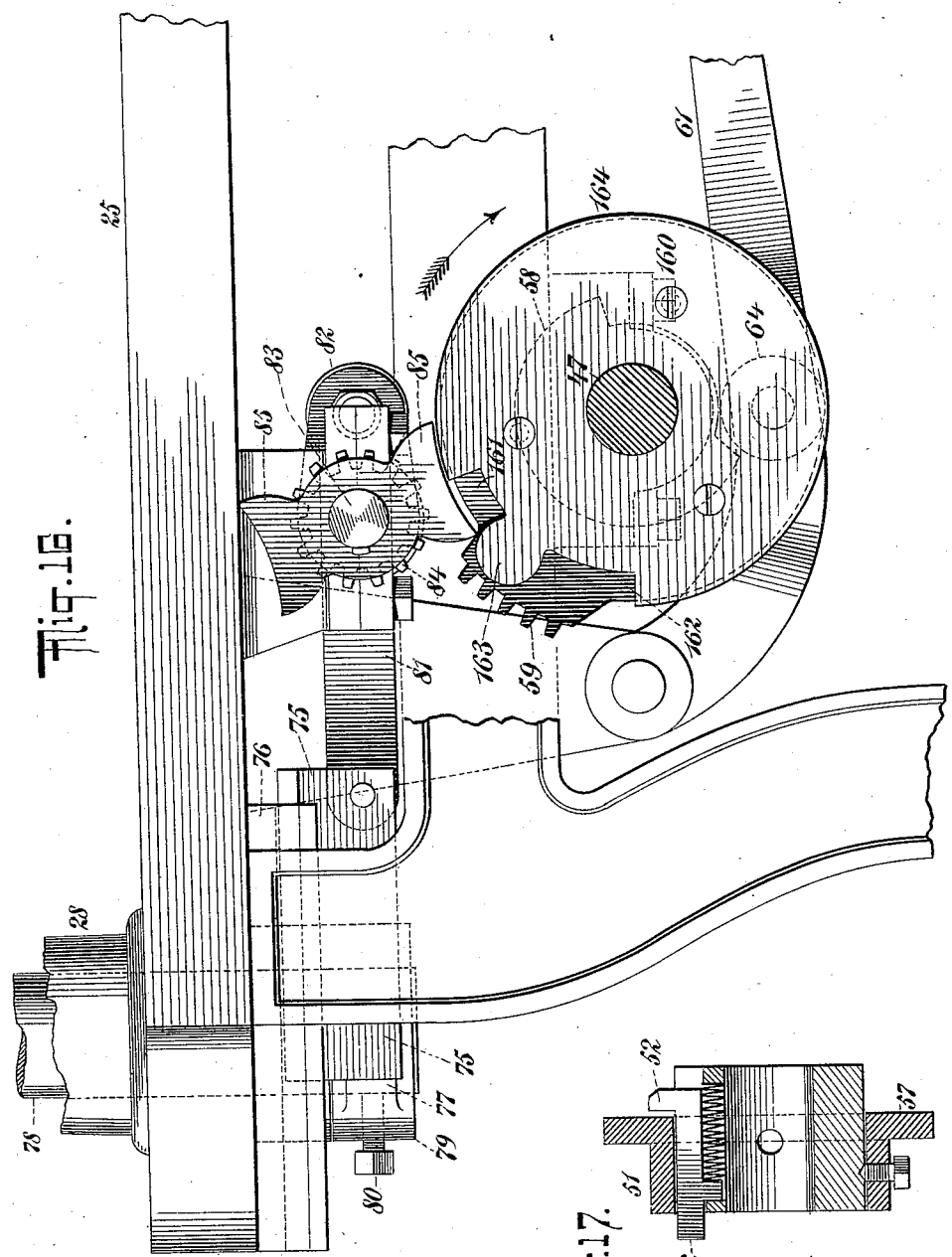
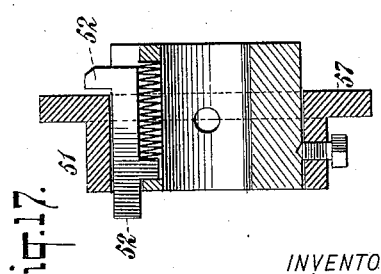
WITNESSES:
Gustave Dieterich
John Kehlenbeck.
INVENTOR
John R. Williams,
BY
Chas. C. Gill
ATTORNEY
THE NORRIS PETERS CO., PHOTO-LITHO., WASHINGTON, D. C.

UNITED STATES PATENT OFFICE.

JOHN R. WILLIAMS, OF EAST ORANGE, NEW JERSEY, ASSIGNOR TO THE JOHN R. WILLIAMS COMPANY, OF NEW YORK, N. Y.

MACHINE FOR CUTTING OUT WRAPPERS OR BINDERS FOR CIGARS.

SPECIFICATION forming part of Letters Patent No. 594,507, dated November 30, 1897.

Application filed June 24, 1897. Serial No. 642,071. (No model.)

*To all whom it may concern:*

Be it known that I, JOHN R. WILLIAMS, a citizen of the United States, residing at East Orange, in the county of Essex and State of New Jersey, have invented certain new and useful Improvements in Machines for Cutting Out Wrappers or Binders for Cigars and the Like; and I do declare the following to be a full, clear, and exact description of the invention, such as will enable others skilled in the art to which it appertains to make and use the same, reference being had to the accompanying drawings, and to the figures of reference marked thereon, which form a part of this specification.

The invention relates to improvements in machines for cutting out wrappers or binders for cigars and the like, and pertains more particularly to improvements on the class of machines made the subject of Letters Patent of the United States No. 400,153, granted March 26, 1889, to The John R. Williams Company as assignee of John R. Williams.

The present invention consists in the various novel features of construction and combinations of parts hereinafter described and more particularly pointed out in the claims.

The invention will be fully understood from the detailed description hereinafter presented, reference being had to the accompanying drawings, in which—

Figure 1 is a top view of a machine constructed in accordance with and embodying the invention. Fig. 2 is a section through a portion of same on the dotted line 2 2 of Fig. 1 and illustrating more particularly the means for moving upward the rolling-table to about the level of the upper edges of the die in order that a proper surface may be formed upon which the wrappers or binders cut by the die and held by air-suction may be rolled around the bunch or "filler." Fig. 3 is a side elevation, partly broken away, of the machine. Fig. 4 is a longitudinal section through a portion of the machine on the dotted line 4 4 of Fig. 1. Fig. 5 is an enlarged detached side elevation of the end of the oscillating arm carrying the pressure-rollers and illustrates, on an enlarged scale, the means provided for supporting the frame for said rollers from the said arm and adjusting the said rollers to suit the outline of the cutting-die. Fig. 6 is an enlarged end view of said oscillating arm, pressure-rollers, and the means intermediate said rollers and said arm for supporting and adjusting the rollers. Fig. 7 is an enlarged detached vertical section through the air-valve and its casing, said casing in use being connected at its upper end with the interior of the cutting-die and at its lower portion with the main air-pipe leading to the usual suction-blower or other means for creating a downward suction through the platen of the die. Fig. 8 is an enlarged detached face view of the gear-wheel mounted on the driving-shaft and by which through intermediate mechanism the oscillating arm carrying the pressure-rollers has its movement imparted to it. Fig. 9 is an edge view of said gear-wheel. Fig. 10 is an enlarged detached face view of a disk or plate which in use is secured to or made integral with the gear-wheel shown in Figs. 8 and 9. Fig. 11 is an edge view of the plate or disk illustrated in Fig. 10. Fig. 12 is a face view of a lock which is secured on the shaft driven by the gear-wheel shown in Fig. 8 and which locks said shaft against rotation without interfering with the continued rotation of the said gear-wheel by the engagement of the ends of said lock with the regular portion of the periphery of the plate shown in Figs. 10 and 11. Fig. 13 is an edge view of said lock. Fig. 14 is an enlarged face view of the cam which is utilized to depress the rolling-table surrounding the die and maintain the same in its depressed position during such time as the operator is engaged in placing the leaf on said die and the pressure-rollers carried by the oscillating arm are moving over said die to cut the wrapper from said leaf, after which the said cam elevates the said table in order to furnish a suitable surface upon which the filler may be rolled within the cut wrapper or binder. Fig. 15 is an edge view of the cam illustrated in Fig. 14. Fig. 16 is an enlarged view showing the relations of the gear-wheel, plate, and lock shown, respectively, in Figs. 8, 10, and 12, Fig. 16 having been presented to clearly illustrate the mechanism by which the oscillating arm carrying the pressure-rollers is moved across the cutting-die and arrested at each end of its movement without interfering with the main driving-shaft continuing its movement until it has made a complete revolution, when it is automatically stopped by the clutch mechanism provided for that purpose; and Fig. 17 is a detached enlarged vertical section through the clutch-sleeve.

In the drawings the numeral 25 designates the main bed-plate of the machine, and 26 the supporting legs or frames therefor. Upon the front portion of the bed-plate 25 is mounted the cutting-die 27, and upon the rear portion of the bed-plate is secured the post 28, upon which is pivotally secured the rear end of the oscillating arm 29, whose front end carries the pressure-rollers 30 and by means of said rollers effects the cutting of the wrapper by means of the die 27. The die 27 is in the path of the line of travel of the rollers 30, and with each motion of the arm 29, which oscillates across the die 27, a wrapper is cut.

The die 27 and its accessories shown in Fig. 2 are identical with the die and its accessories illustrated in the aforesaid Letters Patent No. 400,153 and shown more particularly in Figs. 4, 5, and 6 of said patent, and hence but a brief description of these parts presented in the machine made the subject of this application will be necessary. The die 27 is in the outline of the wrapper or binder to be cut and is supported upon the table 25. The die 27 is hollow and connected with the air-suction pipe 31, and adjacent to the upper portions of the die 27 is the two-part table 32, which is adapted to have a limited vertical motion and is held at its ends in the horizontal guides 33, which enable the two parts of the table 32 to have a slight laterally-yielding motion and follow the vertical surfaces of the die 27. The two parts of the table 32 are connected by the coiled springs 34, which pull the said parts of the table toward one another and against the edges of the die 27, as shown and described in the aforesaid Patent No. 400,153.

The table 32 is supported upon a frame 35, having at its ends the above-mentioned guides 33 and supported upon the rods 36, which extend downward through the bed-plate 25 and have collars 37 at their lower ends. Upon the rods 36, intermediate the collars 37 and bed-plate 25, are the coiled springs 38, which have a downward tension, tending to pull the rods 36, frame 35, and table 32 to their downward position. Below the rods 36 is the usual plate 39, which is driven upward against the rods 36 when it is desired that the table 32 should ascend to its position about on a level with the upper edges of the die 27. The plate 39 is moved to its upward position by toes 40 40, secured on the crank-shafts 41 41, as indicated by dotted lines in Fig. 2, and said shafts 41 upon being turned in their bearings will cause the toes 40 to turn upward against the plate 39 and move the latter upward to effect the elevation of the table 32. Upon one of the shafts 41 is secured the wheel 42, and upon the other shaft 41 is secured the crank-arm 43, and said crank-arm and said wheel are connected by the pivoted rod 44. The wheel 42 is provided to receive the end of the chain or like connection 45. All of the parts shown in Fig. 2 are substantially, both as to construction and operation, the same as the devices described in the aforesaid Patent No. 400,153. In the said Patent No. 400,153 the chain corresponding with the present chain 45 is operated by a foot-treadle to elevate the table 32 and maintain the same in its elevated position, it being necessary, in the construction of said patent, for the operator to maintain her foot upon the table during all such time as she desires the table 32 to remain in its elevated position. In the present instance there is no foot-treadle connected with the chain 45, but, on the contrary, the said chain is acted upon to effect the elevation of the table 32 and maintain the latter in its elevated position by power from the driving-shaft. Within the die 27 is provided a suitable platen 46, through which the air-suction may act to hold the leaf upon the die during the cutting of the wrapper and then hold the wrapper under air-suction during the rolling of the filler therein. The platen 46 may be of any of the known forms adapted for the purposes intended. The parts illustrated in Fig. 2 being substantially the same as the corresponding parts shown and described in the aforesaid Patent No. 400,153 are not sought to be separately claimed herein.

In the aforesaid Patent No. 400,153 the table was operated to move upward and remain upward a proper length of time by the pressure of the operator's foot upon a treadle, and the pressure-rollers were operated solely by hand to effect the cutting of the wrappers, and thus the attention and strength of the operator were necessarily consumed in attention to the operation of the machine, instead of being devoted to the economical handling of the leaf and the rolling of the cigars. In the present machine the table 32 is moved in one direction by power from the main driving-shaft and in the other direction by the springs 38 on the rods 36, supporting said table 32, and the pressure-rollers 30 receive their motion from the main driving-shaft.

The main driving-shaft of the machine is designated by the numeral 47 and receives its power from the belt-wheel 48 through the intermeshing pinion-wheel 49 and gear-wheel 50, the former being on the shaft of the belt-wheel 48 and the latter being on the main driving-shaft 47. Adjacent to the gear-wheel 50 the main driving-shaft 47 is provided with the clutch 51, which operates to automatically stop the driving-shaft 47, and consequently the entire operative part of the machine, at the end of each revolution of said driving-shaft. The gear-wheel 50 is loose on the shaft 47, and the clutch is provided with the projecting slide 52, which, as usual, has a spring-tension toward the gear-wheel 50 and engages the pins formed at the inner side of said wheel 50, as shown in Fig. 1. At the end of each revolution of the shaft 47 the projecting end of the slide 52 will come into contact with the edge of the pivoted blade 53 and be thereby moved outward in a direction from the gearwheel 50, thus disengaging the said gearwheel 50 and allowing the latter to turn freely on the shaft 47 without revolving the latter. When it is desired that the power from the gear-wheel 50 should revolve the shaft 47, the operator by pressing on the foot-treadle 54 will, through the pitman-rod 55, turn the blade 53 downward from the slide 52, and thus permit the latter under its spring-tension to again engage the gear-wheel 50 and thereby connect the latter with the shaft 47. The blade 53 is held in its upward position against the clutch by means of the coiled spring 56, as shown in Fig. 3, and hence upon the complete revolution of the shaft 47 the said blade 53 is in a position to force the slide 52 outward from the wheel 50. The projecting end of the slide 52 is beveled, as shown in Fig. 1, in order that it may pass upon and be moved outward by the blade 53, the latter passing between said projecting beveled end of the slide 52 and the collar 57 of the clutch. The clutch mechanism shown in Figs. 1 and 3 constitutes simply a convenient form of clutch for stopping the driving-shaft 47 at the end of each of its revolutions, and this clutch is similar to the clutches for accomplishing the like purpose shown in various Letters Patent of the United States heretofore granted to me—for instance, in Letters Patent of the United States No. 422,000. The present application is not therefore limited to any special form of clutch mechanism for the stopping of the shaft 47 at the end of each of its revolutions.

The shaft 47 carries the cam 58, which is utilized in connection with the operation of the table 32, and said shaft also carries the gear-wheel 59, which through intermediate mechanism imparts to the arm 29 its oscillating movement to enable the latter to carry the rollers 30 across the die 27. The cam 58 is more clearly illustrated in Figs. 14 and 15, and in its operative position is illustrated in Figs. 1 and 4. The cam 58 is rigid on the shaft 47 and is in the form of a wheel having a depression 60 cut therein. Below the cam 58 is mounted the rod 61, whose rear end is pivotally secured to the hanger 62 and whose front end is connected with the chain 45, connected with the wheel 42. That portion of the arm 61 immediately below the cam 58 contains an elongated opening 63, within which is mounted the roller 64, the latter being for direct contact with the periphery of the cam 58. During the revolution of the driving-shaft 47 and cam 58 the periphery of the said cam will press upon the roller 64, the latter being held up against said cam by reason of the tension of the springs 38, acting to drive the plate 39 and toes 40 downward. The depression of the toes 40 will, as will be apparent from an inspection of Fig. 2, cause the winding of the chain 45 upon the wheel 42, and consequently the front end of the arm 61 will be pulled upward and the roller 64 will hug the cam 58. While the depression 60 of the cam 58 is passing over the roller 64, as illustrated in Fig. 4, the springs 38 will be permitted to have their fullest action and will retain the plate 39 and table 32 in their lower position. After the depression 60 of the cam 58 has passed beyond the roller 64 the greater projecting surface of said cam will pass against the roller 64 and drive the front end of the arm 61 downward, causing said arm to pull downward on the chain 45 and through the intermediate mechanism to drive the rods 36 and table 32 upward to their upper position, about on a level with the upper edges of the die 27. The elevated portion of the cam 58 is numbered 65 and is greater in extent than the depressed portion 60 of said cam, and hence the cam 58 will retain the table 32 in its upper position a longer time than the depression 60 of the cam will permit the table under the action of the springs 38 to remain in its lower position. The depressed portion 60 of the cam 58 acts upon the roller 64 and rod 61 to permit the lowering of the table 32 during such time as it is necessary for the operator to place the leaf upon the die 27 and for the rollers 30 to pass over said leaf to effect the cutting of the wrapper therefrom, and the projecting portion 65 of the cam 58 acts through the rod 61 and intermediate devices to hold the table 32 in its elevated position a sufficient length of time for the operator to roll the filler within the wrapper held by air-suction upon the platen 46. Thus the cam 58 directly effects the elevation of the table 32 and permits the springs 38 to lower said table, and the timing is such that the table 32 is maintained in its upward position a greater length of time than it is permitted to remain in its lower position in order that there may be no waste of time after the passage of the rollers 30 over the die and before the operator commences to roll the filler within the wrapper, all the time possible during the revolution of the shaft 47 being given to the operator to roll the cigar.

The die 27 is connected with air-suction which holds the leaf preparatory to the cutting of the wrapper therefrom and then holds the wrapper while the latter is being rolled upon the filler, and this air-suction may be created by any suitable suction-blower connected with the main air-pipe 66, into which is led the auxiliary air-pipe 31, passing from the valve-casing 67, (more fully shown in Fig. 7,) and which is directly below and in communication with the die 27. Within the valve-casing 67 is provided the valve 68, whose rod 69 is provided with the coiled spring 70 and is connected with the pivoted lever 71, the latter being pivotally connected with the upper end of the pitman-rod 72, adapted for operation by a foot-treadle 73. The suction-blower may be used for a number of the machines or for only one of the machines. When used for only one of the machines, the valve 68 may be left open constantly, since little or no waste is caused thereby; but when the suction-blower is connected by piping with various machines, some in operation and some not, it is better that the valve 68 for the machines not in use be closed, so as not to detract from the force of the air-suction in the machines in use. The spring 70 on the valve-rod 69 operates to automatically close the valve 68, and when the valve 68 is to be opened pressure will be applied upon the foot-treadle 73, whereby through the lever 71 the rod 69 will be driven upward and the valve 68 elevated from its seat. The effect of the air-suction is, as is well known in this art, to smoothly hold the leaf while the wrapper is being cut and then to hold the wrapper smoothly while the filler is being rolled therein.

The oscillating arm 29, carrying the rollers 30, receives its movement from the driving-shaft 47, through the rack 75, which has a reciprocating motion in the guide 76 and engages the segment 77, rigidly connected with the lower end of the pin or post 78, which extends downward through and is rendered rigid with the tubular rear end of the arm 29, the lower end of said pin 78 also extending downward through the tubular post 28, upon which the rear end of the arm 29 is mounted. The segment 77 is provided with a collar 79, which is fastened to the lower end of the pin 78 by means of the screw 80, as more clearly shown in Fig. 16. The rack 75 has a definite reciprocating motion imparted to it from the shaft 47 and during its motion in one direction moves the arm 29 to carry the rollers 30 from the position of said rollers shown in Fig. 1 to a corresponding position at the other end of the rolling-table 32, and during the motion of said rack 75 in the other direction it actuates the arm 29 to carry the rollers 30 back to the position in which said rollers are illustrated in Fig. 1. The arm 29 stops at the end of each movement across the table 32 and die 27, and during each movement across said table and die effects the cutting of a wrapper.

The rack 75 has connected to it the pitman-rod 81, which at its forward end is pivotally connected with the crank 82, mounted on the inner end of the shaft 83, the latter being supported in bearings below the bed-plate 25 and having at its outer end the pinion-wheel 84 and locking-plate 85, said pinion and locking-plate being rigid on the shaft 83 and their form being illustrated more clearly in Figs. 12 and 16. The pinion 84 on the shaft 83 is engaged at definite intervals by the teeth on the gear-wheel 59, said teeth being few in number, in order that the pinion-wheel 84 and arm 29 will not have a movement continuous with the revolution of the shaft 47, but will complete their movement before the shaft 47 comes to a stop at the end of its revolution. Upon the side of the gear-wheel 59 is secured the plate 160, whose form is clearly illustrated in Fig. 10 and which coöperates with the locking-plate 85 to hold the shaft 83 against revolution after the arm 29 has completed its stroke from one end to the other end of the rolling-table 32 and die 27. The locking-plate 160 is provided with the short recess 161 and the longer recess 162, and between these recesses is the projection 163, while from the outer edge of the recess 161 to the outer edge of the recess 162 the surface numbered 164 of the plate 160 is smooth and regular and conforms to the concave surfaces at the opposite ends of the locking-plate 85, as more clearly illustrated in Fig. 16. When the plate 160, gear-wheel 59, locking-plate 85, and pinion-wheel 84 are in the relations in which they are illustrated in Fig. 16 and the driving-shaft 47 is in motion, the toe 163 of the plate 160 will strike against the lower corner of the plate 85 and commence the rotation of the shaft 83, the said lower corner of the plate 85 turning into the recess 161 of the plate 160 and the few teeth of the gear-wheel 59 coming into contact with the pinion-wheel 84 and rotating the latter with the shaft 83. The pinion-wheel 84 and plate 85 revolve in unison, and hence, in order that what is in Fig. 16 the upper end of the plate 85 may not interfere with the rotation of the shaft 83 unduly, the recess 162 in the plate 60 is provided, and during the rotation of the gear-wheel 59 and pinion 84 the said recess 162 will receive what will then become the lower corner of the plate 85 in order to permit the pinion-wheel 84 to complete its extent of movement necessary to effect the reciprocation of the slide 75. As soon as the teeth of the gear-wheel 59 leave the pinion-wheel 84 what in Fig. 16 is illustrated as the upper end of the plate 85 will become the lower end of said plate and will engage the surface 164 of the plate 160, and since said end of the plate is concaved to fit the convexity of the said surface 164 of the plate 160 it will be evident that the latter may continue its rotation with the shaft 47 and at the same time by its engagement with the plate 85 lock the latter and through it the pinion 84 and shaft 83 against rotation. Thus during the movement of the extended surface 164 of the plate 160 against the end of the locking-plate 85 the latter and the pinion-wheel 84 and parts operated therefrom will be locked against movement and remain at rest. As soon, however, as the toe 163 of the plate 160 comes into contact with the then lower end of the plate 85 the said plate will be caused to turn preparatory to the teeth of the gear-wheel 59 reaching and engaging the teeth of the pinion-wheel 84, after which the pinion-wheel 84 will continue to be revolved during such time as the teeth of the gear-wheel 59 are in engagement with it, and after the teeth of the gear-wheel 59 leave the pinion-wheel 84 the then lower end of the locking-plate 85 will be engaged by the surface 164 of the plate 160, with the result that the pinion-wheel 84 and oscillating arm 29 will be locked against movement. The number of teeth in the gear-wheel 59 should be sufficient simply to effect the movement of the oscillating arm 29 from one end to the other of the rolling-table 32 and die 27. Thus with each revolution of the gear-wheel 59 the arm 29, carrying the rollers 30, is moved from one end to the other of the rolling-table 32 and die 27 to effect the cutting of the leaf, and is then arrested to enable the operator during the continued revolution of the driving-shaft 47 to roll the filler within the cut wrapper held upon the platen 46. It will be observed that only a small portion of the revolution of the driving-shaft 47 is utilized to effect the movement of the arm 29 for the purpose of cutting the wrapper, and that the shaft 83 during the cutting of each wrapper makes simply a one-half revolution.

The oscillating arm 29, carrying the rollers 30, is not in itself new, but the means shown for supporting the rollers 30 from said arm and adjusting said rollers compose a part of the present invention. This portion of the invention is more clearly illustrated in Figs. 5 and 6, in which it will be seen that the rollers 30 correspond with one another and are mounted end to end upon a shaft 90, the latter passing through central openings in said rollers, which openings, as indicated by the dotted lines in Figs. 5 and 6, are greater in diameter than the diameter of the shaft 90, thus permitting the shaft 90 to be rigidly held by the screws 91 and allowing the rollers 30 to have an upwardly-yielding motion thereon. The ends of the shaft 90 are secured in the depending portions 92 92 of the frame 93, which is secured to the front end of the arm 29 by means of the two screws or bolts 94 94. The lower ends of the bolts 94 enter threaded apertures in the longitudinal center of the top of said frame 93, as indicated in Fig. 6, and have at their upper ends the heads 95 and washers 96. The openings in the arm 29, through which the screws or bolts 94 pass, are much greater in diameter than the diameter of said screws or bolts 94, as indicated by dotted lines in Figs. 5 and 6, and the purpose of thus having the enlarged openings in the arm 29 to receive the upper portions of the bolts or screws 94 is to permit of either a lateral or longitudinal adjustment of said bolts or screws 94 within said openings in order that the frame 93 carried by the lower ends of the said bolts or screws 94 may be adjusted so that the rollers 30 will meet the shape, wear, or other exigencies of the die 27. The bolts 94 also permit of a vertical adjustment of the frame 93, whereby the said frame and the rollers 30 are rendered still further capable of adjustment to meet the conditions of the die 27 and also with regard to the nature and condition of the leaf to be placed on said die and from which the wrappers are to be cut. At opposite sides of the front end of the arm 29 are provided the screws 97, which engage threaded openings in said arm 29 and have upon their upper ends the nuts 98, while their lower ends simply impinge the upper horizontal surface of the roller-frame 93. I prefer to use four of the screws 97, and their purpose is to constitute adjustable stops against which the roller-frame 93 may be tightly moved by the operation of the screws or bolts 94. In the operation of adjusting the rollers 30 the screws or bolts 94, by means of their heads 95, will be screwed either upward or downward, as circumstances require, to the proper distance, and the stops 97 will be correspondingly adjusted in order that by screwing downward on the bolts 94 the frame 93 may be drawn rigidly against the lower ends of the screws 97 and be firmly maintained in its set position. The nuts 98 on the screws 97 are jam-nuts. By means of the enlarged openings in the arm 29 to receive the bolts 94 the frame 93 may be adjusted longitudinally or laterally or given an axial motion, or one end of said frame 93 may be tilted either downward or upward within limited extents, and the frame 93 may be secured in its set position by means of the stop-screws 97, which are independently adjustable to meet the desired position for the frame 93. The rollers 30 should be upwardly yielding to a limited extent, and to secure this result I provide each roller with the yokes 99, which are suspended upon the screws 100, the upper ends of the latter passing upward through the top of the frame 93 and being provided with the adjusting-nuts 101. Intermediate the ends of the yokes 99 and the lower surface of the top of the frame 93 are provided the coiled springs 102, which press downward upon the ends of the yokes 99 and yield upward under the pressure of the rollers 30 against said yokes. The yokes 99 extend transversely over the top of the rollers 30 and are curved upward at their middle portions, and said yokes 99 carry the rollers 103, which impinge the rollers 30 at each side of the longitudinal center of said rollers, as more clearly indicated in Fig. 6. When the rollers 30 are moving over the cutting-die 27, they will be pressed upward against the rollers 103, and this pressure will be exerted indirectly against the springs 102, which will yield sufficiently to prevent the rollers from either injuring the die 27 or bruising the leaf from which the wrapper is to be cut. When the rollers 30 are being moved in one direction across the die 27, the pressure will be exerted more directly against the rollers 103 farthest removed from the end of the die first acted upon by the rollers 30, and when the rollers 30 are being moved in the opposite direction a like result will occur—viz., the pressure of the rollers 30 will be more directly exerted against those rollers 103 farthest removed from the end of the die first acted on by the rollers 30, and said rollers 103 will thus during both movements of the arm 29 serve to keep the rollers 30 down against the die 27 and in proper condition to effect the cutting of the wrapper from the leaf.

The operation of the machine made the subject hereof will probably be understood from the description hereinbefore given, and but a brief further reference to the operation of the machine seems to be all that is necessary.

The parts of the machine being in condition in which they are illustrated in Fig. 1 and power having been applied to the belt-wheel 48 the operator will depress the treadle 73 to open the air-valve 68 and then spread the leaf smoothly over the die 27, after which she will remove her hands from the table 32 and depress with her foot the treadle 54, in order that the blade 53 may be pulled from the clutch and the latter put into operative engagement for the purpose of permitting the power from the wheel 48 to drive the shaft 47. The shaft 47 having thus been put in motion the cam 58 will temporarily retain the table 32 in its downward position, and the toe or projection 163 on the locking-plate 160 will strike the locking-plate 85 and cause the shaft 83 to commence its movement, whereupon the teeth of the gear-wheel 59 will engage the pinion 84 on said shaft 83 and compel the movement of said shaft 83 for the purpose of moving the rack 75 and segment 77, and thereby effecting the movement of the oscillating arm 29 across the table 32 and die 27, this movement of the arm 29 causing the rollers 30 to move over the die 27 and effect the pressing of the leaf thereon and the cutting of the wrapper. As soon as the arm 29 and rollers 30 have moved across the die 27 the surface 164 of the locking-plate 160 will engage the end of the locking-plate 85 and arrest the shaft 83 and arm 29 and absolutely lock said parts against motion during the continued movement of the shaft 47 to complete its revolution. Thus while the arm 29 is operated by power it is held at the end of each of its movements and will not commence a second movement until the operator, by placing her foot on the treadle 54, again connects the clutch mechanism, so as to permit the shaft 47 to commence another revolution. As soon as the rollers 30 have moved across the die 27 and a wrapper has been cut from the leaf the cam 58 on the shaft 47 will, by reason of its projecting portion 65, drive the arm 61 downward and thereby effect the elevation of the table 32 to about the level of the upper edges of the die 27, whereupon the operator will immediately roll the bunch or filler within the wrapper held upon the platen 46, and by the time this has been accomplished the cam 58, by reason of its depression 60, will permit of the lowering of the table 32 by means of the springs 38. The machine will at this time have completed one revolution of its driving-shaft 47 and come to a stop. The operator will thereupon at once spread another leaf upon the die 27 and depress the treadle 54 to release the clutch mechanism and permit the power from the wheel 48 to revolve the shaft 47, whereupon the operation above outlined will be repeated in the cutting of another wrapper and the same will be rolled around the filler or bunch. The arm 29, carrying the rollers 30, is moved to perform its duty during a one-half revolution of the shaft 83 and during a small fraction of the revolution of the shaft 47; but it is necessary that the shaft 47 continue its revolution after the arm 29 has come to a stop in order that the cam 58 may elevate the table 32 and maintain the same in its elevated position during the rolling of the filler or bunch, and also permit the lowering of said table 32 just prior to the stopping of the shaft 47 at the end of its revolution, whereby the die 27, upon the stoppage of the shaft 47, is left in proper condition to receive another leaf for the subsequent operation of cutting a wrapper by the passage of the rollers 30 across said die. The toe or projection 163 on the plate 160, by coming into contact with the plate 85 before the teeth of the wheel 59 engage the pinion 84, takes the strain of starting the pinion 84 and parts connected therewith instead of leaving this strain to come upon the teeth of the gear-wheels 59 and 84. In the absence of the toe or projection 163 the teeth of the gear-wheels 59 84 should be of sufficient strength not to be strained by starting the shaft 83 and arm 29.

If it should be desired to simply cut wrappers and not roll the cigars on the machine, the table 32 might be omitted, and if any cigar-manufacturer should be willing to put up with the inconvenience of a stationary table in lieu of a vertically-movable table 32 the cam 58 could be omitted from the main driving-shaft 47.

What I claim as my invention, and desire to secure by Letters Patent, is—

1. In a machine of the character described, the die, movable table encompassing said die, and air-suction apparatus connected with said die, combined with the oscillating arm, the pressure-rollers carried thereby, the driving-shaft, mechanism intermediate said shaft and said arm for moving the latter and said rollers across said die and arresting said arm at the end of each of its movements, and mechanism intermediate said shaft and said table, for securing the lowering of said table for the passage of the pressure-rollers over said die and the raising of said table thereafter and then the lowering of said table; substantially as set forth.

2. In a machine of the character described, the die, the movable table encompassing said die, and air-suction apparatus for holding the leaf on said die, combined with the oscillating arm, the pressure-rollers carried by said arm, the driving-shaft, means for automatically stopping said shaft at the end of each revolution, the means for manually starting said shaft after each stoppage thereof, mechanism intermediate said shaft and said arm for moving the latter and said rollers across said die and arresting said arm at the end of each of its movements, and mechanism intermediate said shaft and said table, for securing the lowering of said table for the passage of the pressure-rollers over said die and the raising of said table thereafter; substantially as set forth.

3. In a machine of the character described, the die, the movable table encompassing said die, and air-suction apparatus for holding the leaf on said die, combined with the oscillating arm, the pressure-rollers carried by said arm, the driving-shaft, means for automatically stopping said shaft at the end of each revolution, the means for manually starting said shaft after each stoppage thereof, mechanism intermediate said shaft and said arm for moving the latter and said rollers across said die and arresting said arm at the end of each of its movements, and mechanism intermediate said shaft and said table for securing the lowering of said table for the passage of the pressure-rollers over said die and the raising of said table thereafter and then the lowering of said table, the mechanism being so arranged that said pressure-rollers are moved and said table elevated and then lowered during each revolution of said driving-shaft and that said rollers are moved to effect the cutting of the wrapper during the early part of the revolution of said shaft and are then arrested until said shaft starts to make another revolution; substantially as set forth.

4. In a machine of the character described, the die, the movable table encompassing said die, and air-suction apparatus for holding the leaf on said die, combined with means normally holding said table in its lower position, the oscillating arm, the pressure-rollers carried by said arm, the driving-shaft, means for automatically stopping said shaft at the end of each revolution, the means for manually starting said shaft after each stoppage thereof, mechanism intermediate said shaft and said arm for moving the latter and said rollers across said die and arresting said arm at the end of each of its movements, the cam on said shaft, and mechanism intermediate said cam and said table for raising said table after said rollers have passed across said die and maintaining said table in its elevated position a definite length of time and then permitting it to lower; substantially as set forth.

5. In a machine of the character described, the die, the movable table encompassing said die, and air-suction apparatus for holding the leaf on said die, combined with means normally holding said table in its lower position, the oscillating arm, the pressure-rollers carried by said arm, the driving-shaft, means for automatically stopping said shaft at the end of each revolution, the means for manually starting said shaft after each stoppage thereof, mechanism intermediate said shaft and said arm for moving the latter and said rollers across said die and arresting said arm at the end of each of its movements, the cam on said shaft, the arm acted on by said cam and hung by a pivot at one end, and means intermediate the other end of said arm and said table for raising said table after said rollers have passed across said die and maintaining said table in its elevated position a definite length of time and then permitting it to lower; substantially as set forth.

6. In a machine of the character described, the die, the table encompassing said die, and air-suction apparatus for holding the leaf on said die, combined with the driving-shaft, means for automatically stopping said shaft at the end of each revolution, means for starting said shaft after each stoppage thereof, the oscillating arm, the pressure-rollers carried thereby, and mechanism intermediate said shaft and said arm for moving the latter and said rollers across said die and arresting said arm at the end of each of its movements; substantially as set forth.

7. In a machine of the character described, the die, the table encompassing said die, and air-suction apparatus for holding the leaf on said die, combined with the driving-shaft, power mechanism therefor, the oscillating arm, the pressure-rollers carried thereby, and mechanism substantially as described intermediate said shaft and said arm for moving the latter and said rollers across said die and arresting said arm at the end of each of its movements without interfering with the continuing of said shaft on its movement; substantially as set forth.

8. In a machine of the character described, the die, and air-suction apparatus for holding the leaf thereon, combined with the driving-shaft, power mechanism therefor, the oscillating arm, the pressure-rollers carried thereby, and mechanism substantially as described intermediate said shaft and said arm for moving the latter and said rollers across said die and arresting said arm at the end of each of its movements without interfering with the continuing of said shaft on its movement; substantially as set forth.

9. In a machine of the character described, the die, and air-suction apparatus for holding the leaf thereon, combined with the driving-shaft 47, the segmental gear-wheel 59 on said shaft, the locking-plate 160 on said shaft and having the regular convex surface 164, and also the recess in its periphery breaking the continuity of said surface 164, the auxiliary shaft 83, the pinion 84 on said auxiliary shaft, the locking-plate 85 on said auxiliary shaft and having a concave surface to engage the convexity of said regular surface 164, the oscillating arm 29, the pressure-rollers 30 carried by said arm, and means intermediate said shaft 83 and arm 29 for imparting motion from the former to the latter; substantially as set forth.

10. In a machine of the character described, the die and air-suction apparatus for holding the leaf thereon, combined with the driving-shaft 47, the segmental gear-wheel 59 on said shaft, the locking-plate 160 on said shaft and having the regular convex surface 164, and also the recess in its periphery breaking the continuity of said surface 164, the auxiliary shaft 83, the pinion 84 on said auxiliary shaft, the locking-plate 85 on said auxiliary shaft and having a concave surface to engage the convexity of said regular surface 164, the oscillating arm 29, the pressure-rollers 30 carried by said arm, the segment 77 on said arm 29, the sliding rack 75 engaging said segment, and the crank and pitman connecting said rack 75 with said auxiliary shaft 83; substantially as set forth.

11. In a machine of the character described the die and air-suction apparatus for holding the leaf thereon, combined with the driving-shaft 47, the segmental gear-wheel 59 on said shaft, the locking-plate 160 on said shaft and having the regular surface 164, recesses 161 and 162, and toe 163, the auxiliary shaft 83, the pinion 84 on said auxiliary shaft, the locking-plate 85 on said auxiliary shaft and having the concave surfaces at its opposite ends to engage the convexity of said regular surface 164, the oscillating arm 29, pressure-rollers 30 carried by said arm, and means intermediate said shaft 83 and said arm 29 for imparting motion from the former to the latter; substantially as set forth.

12. In a machine of the character described, the die and air-suction apparatus for holding the leaf thereon, combined with the arm 29, the pressure-roller frame 93 carried by said arm, the bolts 94 supporting said frame 93 from said arm and engaging at their lower ends threaded apertures in said frame and passing through free apertures in said arm 29 of such size as to permit movements in transverse direction, the adjustable stop-screws 97 carried by said arm and engaging the top of said frame 93, and the pressure-roller 30 carried by said frame 93, said bolts 94 being at the longitudinal center of said frame 93 and said stop-screws 97 being at opposite sides of said center; substantially as set forth.

13. In a machine of the character described, the die and air-suction apparatus for holding the leaf thereon, combined with the arm 29, the pressure-roller frame carried by said arm, means for adjusting said frame on said arm, the pressure-rollers 30 carried by said frame, the yokes 99 extending transversely over said rollers 30 and having the contact-rollers 103, means suspending said yokes 99 from said frame 93 and upwardly-yielding springs 102 intermediate the ends of said yokes and said frame; substantially as set forth.

14. In a machine of the character described, the die and air-suction apparatus for holding the leaf thereon, combined with the arm 29, the pressure-roller frame 93 carried by said arm, the bolts 94 engaging the top of said frame 93 and passing through free apertures in said arm 29 of such size as to permit movements in transverse directions, the series of screw-stops 97 passing downward through said arm 29 and impinging the top of said frame 93, the pressure-rollers 30 having a central opening and carried by said frame 93, the shaft 90 journaled in the ends of said frame 93 and passing through openings in said rollers 30 but being less in diameter than the diameter of said openings, the yokes 99 passing transversely over said rollers 30, the contact-rollers 103 carried by said yokes at opposite sides of the longitudinal center of said rollers 30, the screws 100 supporting said yokes 99 and the springs 102 on said screws 100 intermediate the ends of said yokes 99 and the top of said frame 93; substantially as set forth.

In testimony whereof I affix my signature in presence of two witnesses.

JOHN R. WILLIAMS.

Witnesses:
 CHARLES C. GILL,
 E. JOS. BELKNAP.